United States Patent
Bachar et al.

(10) Patent No.: US 9,721,094 B2
(45) Date of Patent: Aug. 1, 2017

(54) DETERMINING PRIVACY LEAKS

(71) Applicant: International Business Machines Corporation, Armonk, NY (US)

(72) Inventors: Ronen Bachar, Kiryat Ono (IL); Roee Hay, Haifa (IL); Yoav Shany, Tel-Aviv (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 14/717,123

(22) Filed: May 20, 2015

(65) Prior Publication Data

US 2016/0342792 A1    Nov. 24, 2016

(51) Int. Cl.
*G06F 21/55* (2013.01)
*G06F 21/56* (2013.01)
*G06F 21/62* (2013.01)

(52) U.S. Cl.
CPC .......... *G06F 21/556* (2013.01); *G06F 21/566* (2013.01); *G06F 21/6263* (2013.01); *G06F 2221/2101* (2013.01)

(58) Field of Classification Search
CPC ....... G06F 2221/0737; G06F 2221/074; G06F 21/556
See application file for complete search history.

(56) References Cited

U.S. PATENT DOCUMENTS

| | | | | |
|---|---|---|---|---|
| 8,474,046 B1 * | 6/2013 | Gong | .................... | G06F 21/554 726/22 |
| 8,713,684 B2 | 4/2014 | Bettini et al. | | |
| 9,268,958 B1 * | 2/2016 | Kessler | .................... | G06F 21/62 |
| 9,342,621 B1 * | 5/2016 | Raphel | .............. | G06F 17/30949 |
| 2006/0106866 A1 * | 5/2006 | Green | ............... | G06F 17/30864 709/224 |
| 2009/0300751 A1 * | 12/2009 | Krishnamurthy | ... | H04L 63/0227 726/13 |
| 2010/0205300 A1 * | 8/2010 | Uchida | ............... | G06F 21/6218 709/224 |
| 2011/0289589 A1 * | 11/2011 | Kayashima | ............. | G06F 21/52 726/26 |
| 2013/0097652 A1 | 4/2013 | Bhattacharjee et al. | | |

(Continued)

FOREIGN PATENT DOCUMENTS

| | | |
|---|---|---|
| CN | 103309808 A | 9/2013 |
| CN | 103729595 A | 4/2014 |

OTHER PUBLICATIONS

Egele et al.; "PiOS: Detecting Privacy Leaks in iOS Applications"; International Secure Systems Lab; Dec. 2, 2010; pp. 1-15.

(Continued)

*Primary Examiner* — Farid Homayounmehr
*Assistant Examiner* — Zhimei Zhu
(74) *Attorney, Agent, or Firm* — William H. Hartwell

(57) ABSTRACT

Techniques for determining privacy leaks are described herein. The techniques may include (i) providing private data as input for an application, wherein the private data includes a signature identifying the private data; (ii) monitoring an output of the application for a presence of the signature; and (iii) determining that a private data leak has occurred in the application, wherein the determining is based, at least in part, on the presence of the signature in the output.

18 Claims, 4 Drawing Sheets

(56) References Cited

U.S. PATENT DOCUMENTS

2014/0075542 A1* 3/2014 Boback .............. H04L 63/0272
  726/15
2014/0157422 A1 6/2014 Livshits et al.
2014/0282908 A1 9/2014 Ward et al.
2016/0171009 A1* 6/2016 Fang ................. G06F 17/30109
  707/692

OTHER PUBLICATIONS

Enck et al.; "TaintDroid: An Information-Flow Tracking System for Realtime Privacy Monitoring on Smartphones"; USENIX, 9th Symposium on Operating Systems Design and Implementation, OSDI' 10; 2010; pp. 1-15.

Guarnieri et al.; "Saving the World Wide Web from Vulnerable JavaScript"; ISSTA '11, Jul. 17-21, 2011; Toronto, ON, Canada; Copyright © 2011; ACM; pp. 177-187.

Hornyack et al.; "These Aren't the Droids You're Looking For: Retrofitting Android to Protect Data from Imperious Applications"; Microsoft Research; CCS'11; Oct. 17-21, 2011; Chicago, Illinois, USA; Copyright ©2011; ACM; pp. 639-651.

Tripp et al.; "A Bayesian Approach to Privacy Enforcement in Smartphones"; 23rd USENIX Security Symposium; Aug. 20-22, 2014; San Diego, CA.

Tripp et al.; "TAJ: Effective Taint Analysis of Web Applications"; PLDI'09; Jun. 15-20, 2009; Dublin, Ireland; Copyright ©2009; ACM; pp. 1-11.

"TaintDroid: Realtime Privacy Monitoring on Smartphones"; AppAnalysis; Printed on: Apr. 20, 2015; pp. 1-3, <http://appanalysis.org/>.

* cited by examiner

100

DETERMINING PRIVACY LEAKS

BACKGROUND

The present invention relates generally to security analysis. More specifically, the techniques described herein include monitoring for potential leaks of private information.

Data leaks are known. Generally speaking, data leaks are undesired disclosures of potentially sensitive information to unauthorized entities. Data leak incidents can occur for many reasons, including, for example, by malicious actions and/or inadvertent mistakes (such as programming errors). In the context of mobile computing devices, data leaks can occur when a user's private data is disclosed to an authorized mobile application but is subsequently transmitted by the mobile application to a third party.

SUMMARY

According to an aspect of the present invention, there is a method, computer program product and/or system that performs the following operations (not necessarily in the following order): (i) providing, by one or more processors, private data as input for an application, wherein the private data includes a signature identifying the private data; (ii) monitoring, by one or more processors, an output of the application for a presence of the signature; and (iii) determining, by one or more processors, that a private data leak has occurred in the application, wherein the determining is based, at least in part, on the presence of the signature in the output.

DETAILED DESCRIPTION

The subject matter disclosed herein relates to techniques for determining private data leaks. Preventing private data from being released is a growing concern. For example, in mobile applications, demands to access private information may be frequent. Examples of private information may include a unique identifier of a computing device, such as an International Mobile Equipment Identity (IMEI) number, a phone number, social affiliations of a user of the device, a location of a user, audio and video data, and the like.

While private information often services a core functionality of a given application, it may also serve other purposes such as advertising, analytics, cross-application profiling, and the like. A user may be unaware or unable to distinguish legitimate usage of their private information from illegitimate scenarios, such as sending an IMEI number to a remote advertising website to create a persistent profile of the user. Existing platforms provide limited support for tracking the potential release of private data. In some cases, a platform may track a data flow in the form of taint analysis and provide a Boolean operation wherein if the data flow contains information in a broad category, such as data indicating a location, the data may be suppressed or flagged. However, taint flow analysis requires a tracking of operations of a platform, an application, or the like. In some cases, monitoring sources and sinks without intermediate tracking flow steps between the source and sinks may be employed. However, certain values arising at both a source and a sink may be benign, or otherwise not private.

The techniques described herein include determining potential private data to be released. More specifically, the techniques described herein include selecting a unique value to be inserted into a known private source. For example, a source may include an email. A predefined unique value may be planted into the source and outputs may be monitored. If the outputs monitored overlap with the predefined unique value, a potential privacy leak may be identified. In some cases, the overlap may be determined based on a threshold. For example, a unique value may be determined to be present in an output if a percentage of the unique value occurs at the output. Additional details are described below.

The unique value may be a signature. As used herein, a signature is any unique identifier of the known private source. Some common examples of signatures include, but are not limited to: an RSA signature, a DSA signature, an ElGamal signature, a pairing-based signature, an aggregate signature, and/or a handwritten signature.

Figure 1:
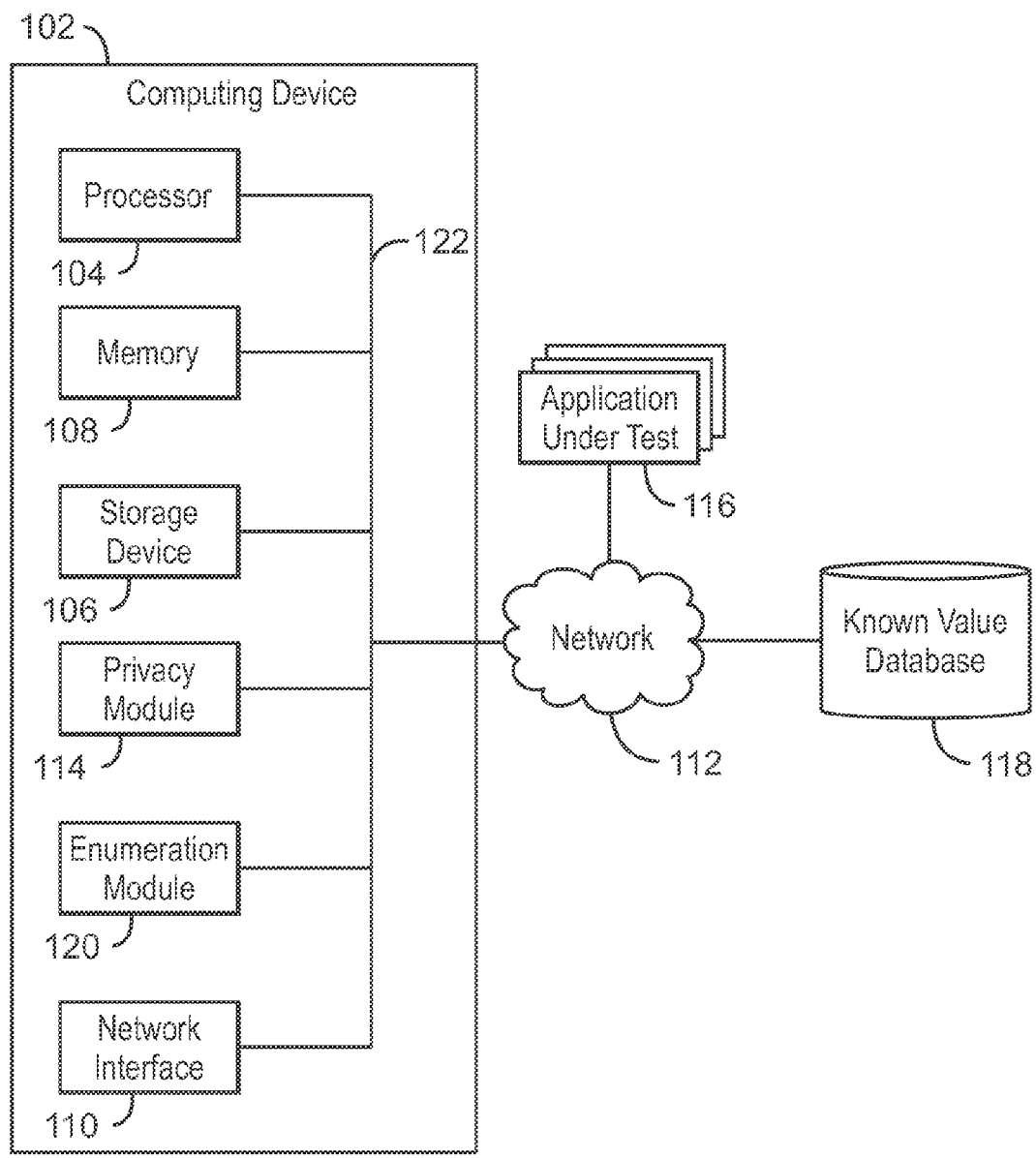
FIG. 1 is a block diagram of a computing system configured to determine a degree of granularity of private data flowing to a sink.

FIG. 1 is a block diagram of a computing system configured to determine a degree of granularity of private data flowing to a sink. The computing system 100 may include a computing device 102 having a processor 104, a storage device 106 comprising a non-transitory computer-readable medium, a memory device 108, and a network interface 110. In some cases, the network interface 110 may be communicatively coupled to a network 112. The computing device 102 may include a privacy module 114 configured to determine a potential private data leak of an application, such as one or more applications under test 116.

The privacy module 114 may be logic, at least partially comprising hardware logic. For example, the privacy module 114 may be electronic circuitry logic, firmware of a microcontroller, and the like. In embodiments, the privacy module 114 may be implemented as instructions executable by a processing device, such as the processor 104. The instructions may direct the processor 104 to select a predefined value (or signature), and insert the predefined value into a private source statement of the application to be tested 116. The output of the application to be tested 116 may be monitored and the privacy module 114 may determine whether the predefined value is present in the output.

In some cases, determining whether the predefined value is present in the output is based on a probability, or degree to which the predefined value is present in the output. For example, the predefined value may be an email value having a predefined set of numerical values, including the term "AppScan", and may be associated with a specific domain. While the entire email value may not be present in the output of the application under test 116, if a percentage of the value overlaps in the monitored output, the privacy module 114 may determine that the predetermined email value is present in the output. Unique values may include a user's contacts, device and user identifiers such as international mobile station equipment identity (IMEI) numbers, international mobile subscriber identity (IMSI) numbers, device location, email, and social accounts, and the like. In some cases, unique values may be stored in a known value database 118.

Unique values may also have predetermined signatures. The predetermined signature may be a pattern or known string. The uniqueness of the values may indicate that each value is not used twice during an analysis including different sources.

Monitoring the output may include monitoring specific output points of the application under test 116, including a file system associated with the application under test 116, internet, and log files. By enforcing unique values and then monitoring release points, leakage analysis may be achieved under black box assumptions. In other words, the techniques described herein may reduce the need for modifying the application to be tested 116. Further, false alarms may be mitigated as the techniques described herein select unique predetermined values that are attempted to be matched by at an output of the application under test 116.

In some cases, certain information may not be controllable. For example, a device ID (IMEI, IMSI, and the like) may not be changeable. However, these types of items may be inherently unique. Therefore, the techniques described herein also include enumeration module 120. The enumeration module may read device data that may be considered private and communicate the private data to the privacy module 114, the known data store 118, or any combination thereof.

The processor 104 may be a main processor that is adapted to execute the stored instructions. The processor 104 may be a single core processor, a multi-core processor, a computing cluster, or any number of other configurations. The memory unit 108 can include random access memory, read only memory, flash memory, or any other suitable memory systems. The main processor 104 may be connected through a system bus 122 to components including the memory 108, and the storage device 106.

The block diagram of FIG. 1 is not intended to indicate that the computing device 102 is to include all of the components shown in FIG. 1. Further, the computing device 102 may include any number of additional components not shown in FIG. 1, depending on the details of the specific implementation.

Figure 2:
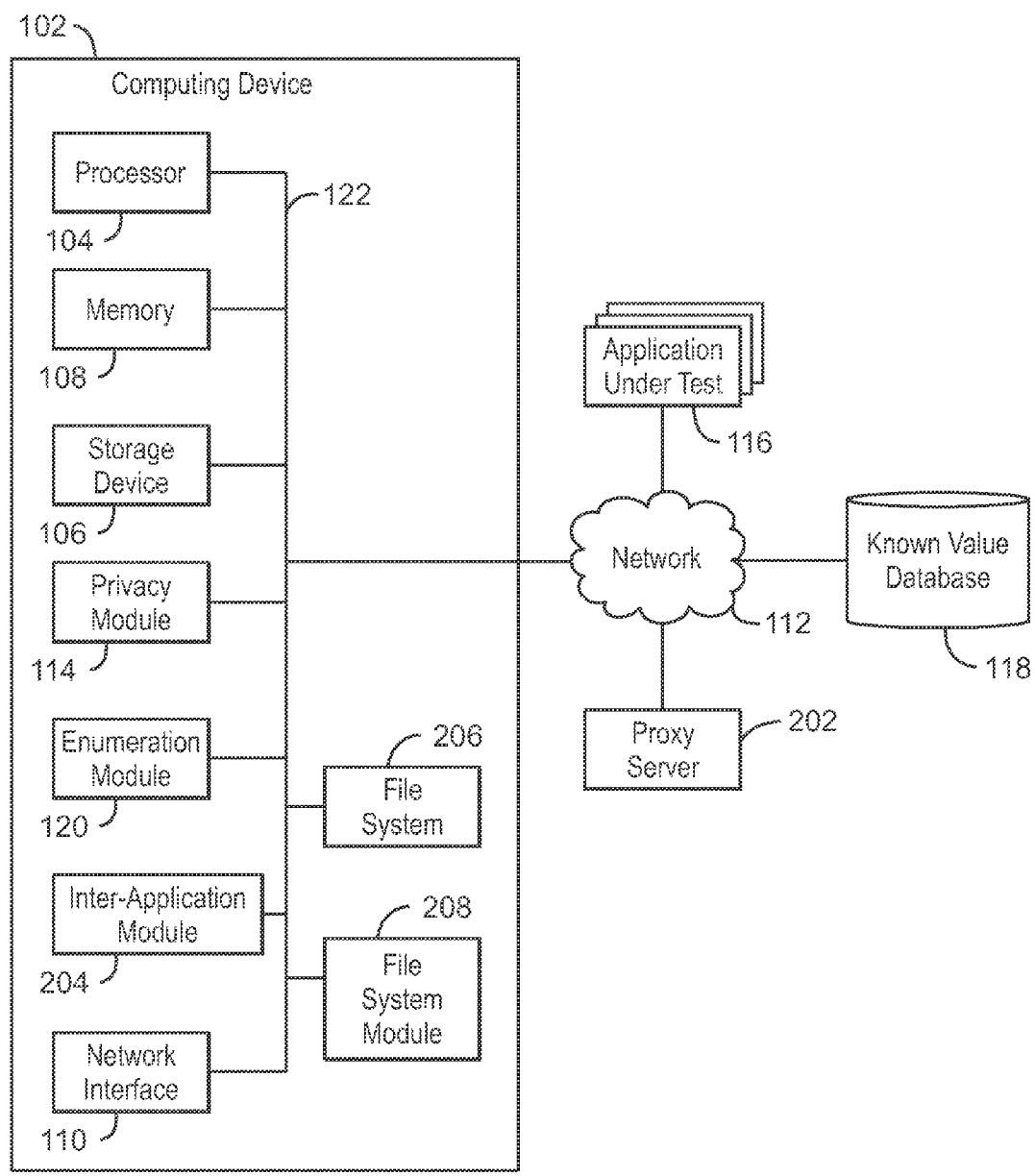
FIG. 2 is a block diagram of a computing system configured to determine private data at a proxy server.

FIG. 2 is a block diagram of a computing system 200 configured to determine private data at a proxy server. In some cases, monitoring output of an application under test, such as the application under test 116 of FIG. 1, includes monitoring content sent out to a proxy server 202. The proxy server 202 may be set at a level of the computing device 102 so that it serves all analysis targets globally. Using the proxy server 202, unique values (that is, signatures) can be searched and matched within a hypertext transfer protocol (HTTP) stream. Further, private data leakage may be detected in protocols such as file transfer protocol (FTP), simple mail transfer protocol (SMTP), HTTP, or any combination thereof.

Further, in some cases, the computing device 102 may include an inter-application module 204. The inter-application module 204 may be configured to intercept inter-process communications (IPC) between the application under test 116 and other applications. Similar to reading device identifiers carried out by the enumeration module 120, IPC messages can be intercepted by the inter-application module 204 that is deployed on the computing device 102 when the application under test 116 is also deployed on the computing device 102.

In some cases, writing of data to a file system 206 may be detected by a file system module 208. The file system module 208 may be configured to check public regions within the file system 206 for modifications, such as querying a "last modified" field of files and folders stored in public file system areas of the file system 206.

The modules including the privacy module 114, the enumeration module 120, the inter-application module 204, and the file system module 208, may be implemented as hardware logic, as software, as firmware and the like. In some cases, the modules 114, 120, 204, and 208 may be implemented as discrete modules, as one module, as individual modules of a larger logic process, or any combination thereof.

Once the monitoring of outputs has occurred, the output may be analyzed to determine whether one or more unique values are present in the output. Analysis may be carried out by a degree to which the unique values overlap the detected outputs. In some cases, circumstances by which the value is released may be analyzed by determining whether data has been output to specific destinations such as an uniform resource locator (URL) to which HTTP data is sent, and the like.

When compared to code-level leakage analyses, which does not predetermine known unique values and the context in which private information is released, the techniques described herein enable direct monitoring of public output points. In some cases, monitoring is only of public output points. For example, file system module 208 may be configured to only monitor public portions of the file system 206 rather than the entire file system 206, and may reduce false alarms generated.

Figure 3:
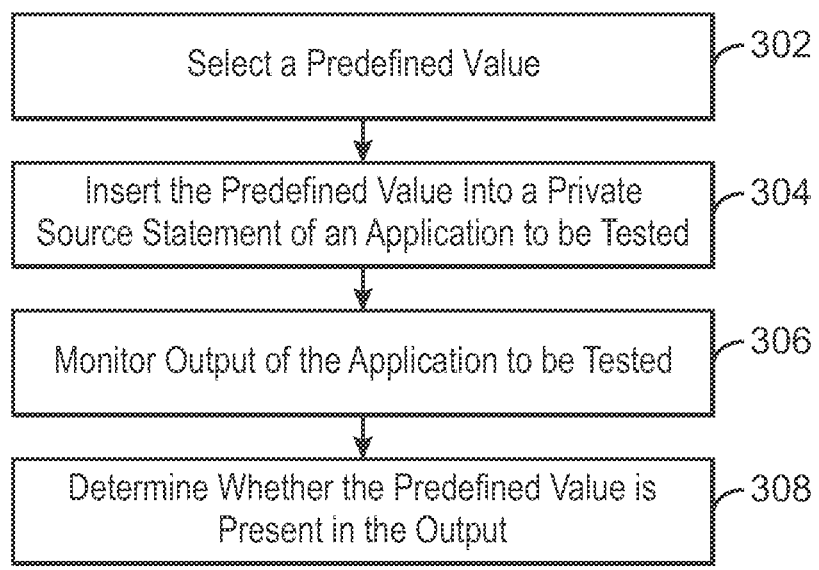
FIG. 3 is a block diagram illustrating a method of determining a potential private data leak.

FIG. 3 is a block diagram illustrating a method of determining a potential private data leak. At block 302, a method 300 includes selecting a predefined value (that is, a signature), and inserting the predefined value into a private source statement of an application to be tested at block 304. At 306, an output of the application can be monitored, and at 308, a determination can be made as to whether the predefined value is present in the output.

In some cases, determining whether the predefined value is present in the output is based on a degree to which the predefined value is present in the output. In some cases, the method 300 may include identification a leakage of private data based on identifying a destination to which the predefined value is output. Monitoring the output includes monitoring only public portions of a file system associated with the application to be tested rather than non-public portions of the file system. In some cases, monitoring the output of the application comprises monitoring a predetermined proxy server to which the output is directed.

In some cases, the application is a first application of a device, and wherein monitoring the output of the application includes monitoring communications with a second application of the device. Further, the predefined value may be a statistically unique value.

Some embodiments of the present invention recognize the following facts, potential problems and/or potential areas for improvement with respect to the current state of the art: (i) existing methods that rely on policy filters require input and/or support from either an operating system and/or a user; (ii) existing methods utilizing labeling can have undesirable side effects due to the format of a given source; and/or (iii) existing methods utilizing access control do not test information releases for the presence of private data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
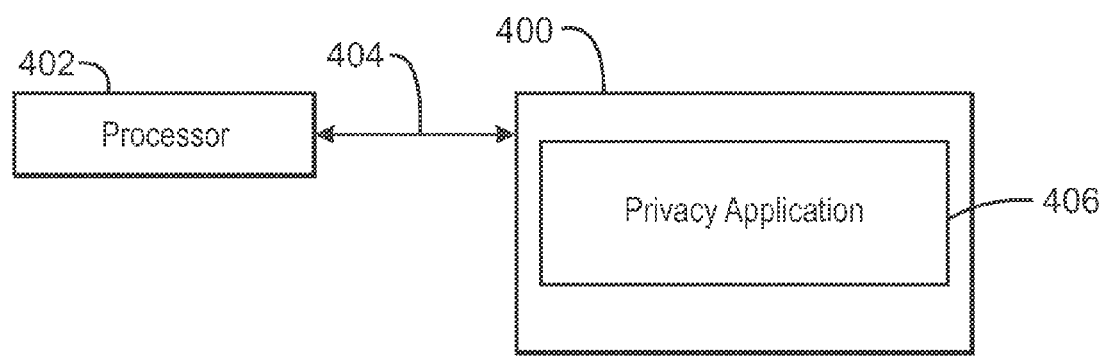
FIG. 4 is a block diagram depicting an example of a tangible, computer-readable storage medium that can be used to compare predetermined unique values output of an application under test.

FIG. 4 is a block diagram depicting an example of a tangible, non-transitory computer-readable storage medium that can be used to compare predetermined unique values output of an application under test. The tangible, non-transitory, computer-readable medium 400 may be accessed by a processor 402 over a computer bus 404. Furthermore, the tangible, non-transitory, computer-readable medium 400 may include computer-executable instructions to direct the processor 402 to perform the steps of the current method.

The various software components discussed herein may be stored on the tangible, non-transitory, computer-readable medium 400, as indicated in FIG. 4. For example, a privacy application 406 may be configured to select a predefined value (or a signature), and insert the predefined value into a private source statement of an application to be tested. The privacy application 406 may further be configured to monitor output of the application to be tested, and determine whether the predefined value is present in the output.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, by one or more processors, private data for which an application of a mobile device has requested access;
    inserting, by one or more processors, a unique signature into the private data, wherein the signature is a statistically unique value;
    providing, by one or more processors, the private data as input for the application, wherein the private data includes the inserted signature identifying the private data;
    monitoring, by one or more processors, public portions of a file system on the mobile device for a presence of the signature; and
    determining, by one or more processors, that a potential private data leak has occurred in the application, wherein the determining is based, at least in part, on the presence of the signature in the public portions of the file system on the mobile device.

2. The method of claim 1, wherein determining that the private data leak has occurred is further based, at least in part, on a degree to which the signature is present in the public portions of the file system on the mobile device.

3. The method of claim 1, wherein determining that the private data leak has occurred is further based, at least in part, on an identification of a destination to which the private data is output.

4. The method of claim 1, further comprising:
    monitoring an output of the application for a presence of the signature, wherein determining that the potential private data leak has occurred in the application is further based, at least in part, on the presence of the signature in the output.

5. The method of claim 4, wherein the application is a first application of the mobile device, and wherein monitoring the output of the application comprises monitoring communications with a second application of the mobile device.

6. The method of claim 4, wherein monitoring the output of the application comprises monitoring a predetermined proxy server to which the output is directed.

7. A computer program product comprising a computer readable storage device having stored thereon:
    instructions executable by a device to cause the device to determine private data for which an application of a mobile device has requested access;
    instructions executable by the device to cause the device to insert a unique signature into the private data, wherein the signature is a statistically unique value;
    instructions executable by the device to cause the device to provide the private data as input for the application, wherein the private data includes the inserted signature identifying the private data;
    instructions executable by the device to cause the device to monitor public portions of a file system on the mobile device for a presence of the signature; and
    instructions executable by the device to cause the device to determine, that a potential private data leak has occurred in the application, wherein the determining is based, at least in part, on the presence of the signature in the public portions of the file system on the mobile device.

8. The computer program product of claim 7, wherein determining that the private data leak has occurred is further based, at least in part, on a degree to which the signature is present in the public portions of the file system on the mobile device.

9. The computer program product of claim 7, wherein determining that the private data leak has occurred is further based, at least in part, on an identification of a destination to which the private data is output.

10. The computer program product of claim 7, further comprising:
    instructions executable by the device to cause the device to monitor an output of the application for a presence of the signature, wherein determining that the potential private data leak has occurred in the application is further based, at least in part, on the presence of the signature in the output.

11. The computer program product of claim 10, wherein the application is a first application of the mobile device, and wherein monitoring the output of the application comprises monitoring communications with a second application of the mobile device.

12. The computer program product of claim 10, wherein monitoring the output of the application comprises monitoring a predetermined proxy server to which the output is directed.

13. A computer system comprising:
a processor(s) set; and a computer readable storage medium; wherein:
the processor set is structured, located, connected and/or programmed to execute instructions stored on the computer readable storage medium; and the instructions include: instructions executable by a device to cause the device to determine private data for which an application of a mobile device has requested access;
instructions executable by the device to cause the device to insert a unique signature into the private data, wherein the signature is a statistically unique value;
instructions executable by the device to cause the device to provide the private data as input for the application, wherein the private data includes the inserted signature identifying the private data;
instructions executable by the device to cause the device to monitor public portions of a file system on the mobile device for a presence of the signature; and
instructions executable by the device to cause the device to determine, that a potential private data leak has occurred in the application, wherein the determining is based, at least in part, on the presence of the signature in the public portions of the file system on the mobile device.

14. The computer system of claim 13, wherein determining that the private data leak has occurred is further based, at least in part, on a degree to which the signature is present in the public portions of the file system on the mobile device.

15. The computer system of claim 13, wherein determining that the private data leak has occurred is further based, at least in part, on an identification of a destination to which the private data is output.

16. The computer system of claim 13, further comprising:
instructions executable by the device to cause the device to monitor an output of the application for a presence of the signature, wherein determining that the potential private data leak has occurred in the application is further based, at least in part, on the presence of the signature in the output.

17. The computer system of claim 16, wherein the application is a first application of the mobile device, and wherein monitoring the output of the application comprises monitoring communications with a second application of the mobile device.

18. The computer system of claim 16, wherein monitoring the output of the application comprises monitoring a predetermined proxy server to which the output is directed.

* * * * *